Oct. 12, 1965  JAMES E. WEBB  3,211,414
ADMINISTRATOR OF THE NATIONAL AERONAUTICS
AND SPACE ADMINISTRATION
THERMALLY OPERATED VALVE
Filed Aug. 7, 1963  3 Sheets-Sheet 1
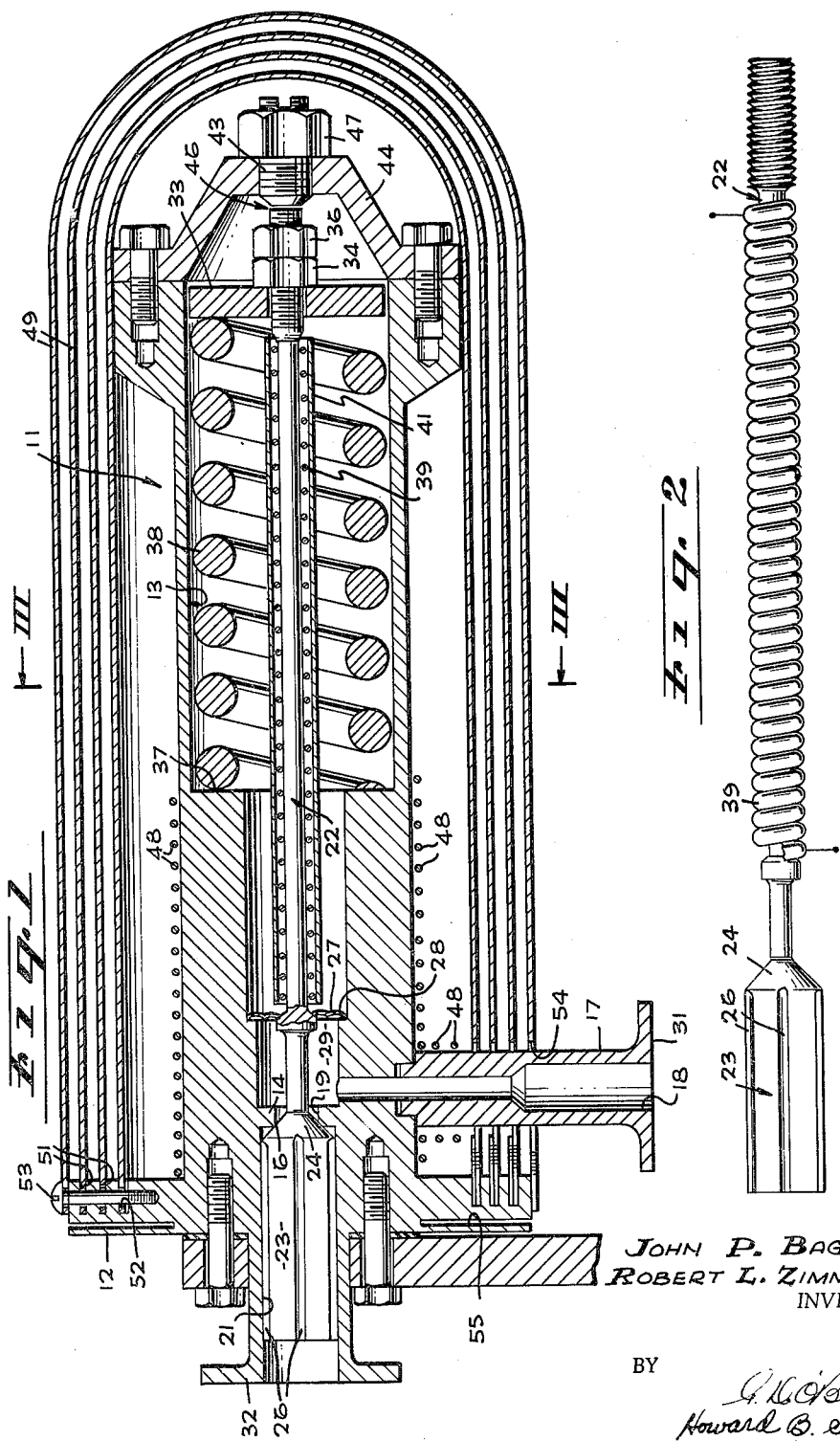
JOHN P. BAGBY
ROBERT L. ZIMMERMAN
INVENTORS
BY
Howard B. Scheckman
ATTORNEYS

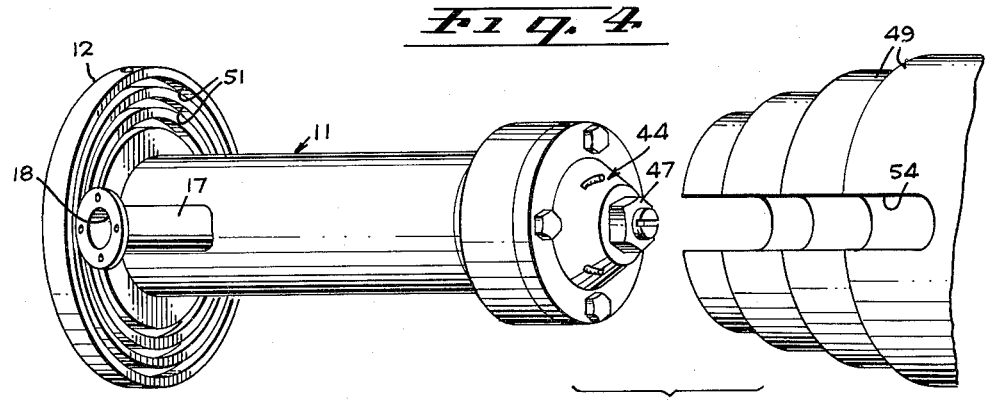
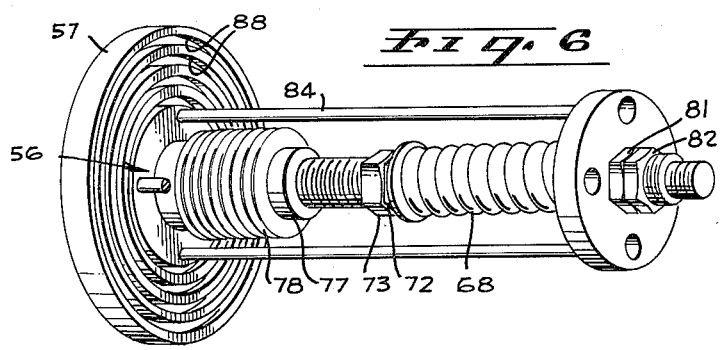
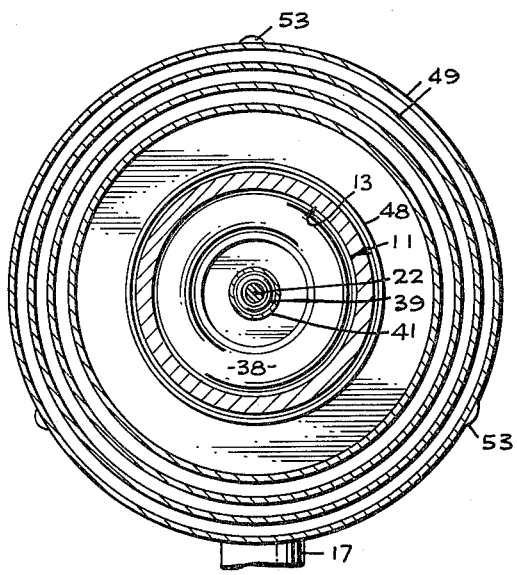

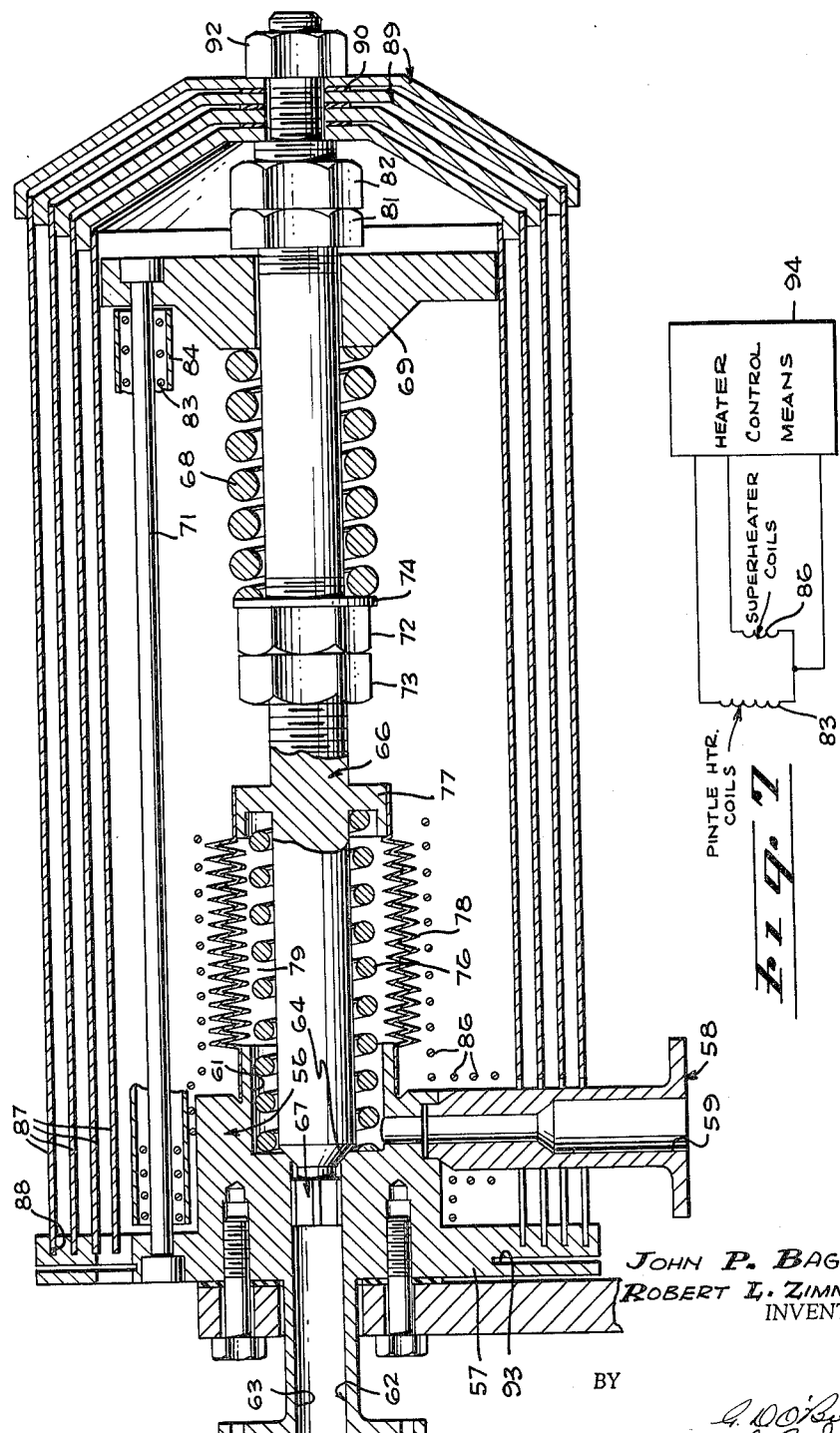

United States Patent Office 3,211,414
Patented Oct. 12, 1965

3,211,414
THERMALLY OPERATED VALVE
James E. Webb, Administrator of the National Aeronautics and Space Administration with respect to an invention of John P. Bagby and Robert L. Zimmerman
Filed Aug. 7, 1963, Ser. No. 300,712
6 Claims. (Cl. 251—11)

The present invention relates to thermally operated valves of the type wherein opening and closing of the valve is controlled by thermal expansion and contraction of expansive members, and is more particularly directed to a valve of this character which is arranged to facilitate reliable remote gas valving in a high temperature environment.

In numerous fluid control applications it is necessary to positively turn on or shut off the flow of fluid through a system from a remote location. Various remotely controllable valves have been provided for this purpose, and prominent among these remotely controlled valves are those of the type wherein the valving action is effected by the controlled application of heat to a thermally expansive member, or members. Where the fluid controlled by the valve is a gas or vapor, a highly effective seal must be established upon closure of the valve. The closing force which may be directly provided by thermal expansion or contraction is relatively small and it has therefore been the usual practice to employ valve packing in conjunction with the closing force to provide a gas or vapor tight sealed closure of the valve. This expedient may be effectively employed in circumstances where a thermally operated valve is used at normal temperatures, however in relatively high temperature applications where temperatures approaching, for example, 800° F. are encountered, packing cannot be utilized in the valve and the sealed closure must be effected purely by a metal-to-metal seat. For example, in the feed system of a cesium ion rocket engine it is necessary to positively turn on or shut off the flow of cesium gas from a boiler, or other source, to the emitter of the engine and in order to feed the cesium gas through the system it must be maintained at an ambient temperature approaching 800° F. Conventional thermally controlled valves have not been suitable for this application for the above-noted reason that the closing force practicably generated by thermal expansion or contraction is too low to provide a vapor or gas-tight sealed closure in the absence of valve packing.

It is therefore an object of the present invention to provide a thermally operated valve for high temperature applications wherein a relatively large spring assisted positive closing pressure is employed to provide a gas-tight closure at a metal-to-metal seat, and yet a relatively small thermally expansive opening force is required to overcome the closing pressure and effect valve opening.

Another object of the invention is the provision of a reliable simple remotely controllable thermally operated valve with few moving parts which is particularly suited to high temperature gas valving applications.

It is yet another object of the invention to provide a valve of the class described wherein provision is made to efficiently maintain the flow path through the valve at a relatively high ambient temperature.

It is still another object of the invention to provide a thermally operated valve which is arranged to prevent premature actuation of the valve due to transient temperature differences between thermally expansive actuating members and other internal parts of the valve caused by sudden changes in the ambient temperature of such internal parts.

One other object of the invention is the provision of a thermally operated valve of the class described wherein the positive closing pressure is readily adjustable.

It is a further object of the present invention to provide a thermally operated valve which is arranged for a minimum of heat transfer between thermally expansive actuating members and the other internal parts of the valve such that a significant temperature differential may be selectively established therebetween to effect thermally expansive actuation of the valve.

A still further object of the invention is the provision of a thermally operated valve of the class described wherein the temperature differential for effecting valve actuation is readily adjustable.

It is an even further object of the invention to provide a thermally operated valve for operation in vacuo, and wherein normal insulation requirements are therefore minimized.

Other objects and advantages of the present invention will become apparent upon consideration of the following description taken in conjunction with the accompanying drawings, wherein:

FIGURE 1 is a longitudinal sectional view of a preferred embodiment of a thermally operated valve in accordance with the present invention;

FIGURE 2 is a detail view of the thermally expansive valve stem of this embodiment;

FIGURE 3 is a sectional view taken at lines 3—3 of FIGURE 1;

FIGURE 4 is an exploded perspective view of this embodiment of the valve;

FIGURE 5 is a longitudinal sectional view of a modified form of thermally operated valve in accordance with the invention;

FIGURE 6 is a perspective view of an internal assembly of the embodiment of FIGURE 5, and FIGURE 7 is a schematic circuit diagram of one electrical control arrangement which may be employed to actuate the valves of FIGURES 1–4 and 5 and 6, respectively.

Considering now the present invention as to its broader aspects and referring generally to the drawings, there will be seen to be provided a thermally operated valve which includes a body having a flow path therethrough which includes a valve seat. A valve stem is mounted for movement coaxially of the seat, and the stem includes a valve head which is engageable with the seat. Accordingly, when the head is disengaged from the seat, gas or other fluid flow is able to proceed through the flow path, whereas engagement of the head with the seat shuts off flow through the flow path. The stem is spring loaded with respect to the body to normally engage the head and seat with a large positive closing pressure to provide a gas or vapor-tight closure at the metal-to-metal seat. The spring loading of the stem hence provides for a gas-tight closure without the requirement of valve packing, and as a result the valve is particularly well suited to high temperature gas-valving applications. Opening of the valve is effected by thermally expansive means in association with the stem and the spring which loads the stem. The thermally expansive means is so associated with the loading spring that upon heating of the expansive means sufficiently above the ambient temperature of the other parts of the valve, the expansive means expands sufficiently to permit resilient expansion of the loading spring into operable relation to a stop which absorbs all of the closing force of the spring normally exerted on the stem. Further expansion of the expansive means is then effective in moving the stem in a direction to disengage the head from the seat. By virtue of the stop means absorbing the force of the loading spring, this substantial spring force need not be overcome by the force exerted by the thermally expansive means in order to effect opening of the valve. Thus, a relatively small thermal expansion force is effective in opening the valve. Of course, when heat is removed from the thermally expansive means and same contracts, the loading spring is moved out of operative association with the stop means, and the full force of the spring is again exerted upon the stem to engage the head with the seat with a substantial closing pressure.

Considering now the thermally operated valve of the present invention in greater detail as to preferred structure thereof, and referring to FIGURES 1–4 of the drawings, the body of the valve is designated at 11, and will be seen to be of generally cylindrical form preferably including an outwardly flared annular flange 12 at one end thereof. The body is hollow to include a bore 13 coaxially therethrough, and such bore includes a constriction 14 adjacent the end thereof provided with flange 12. This constriction is bevelled on the proximal side thereof with respect to the flange 12 to provide the valve seat of previous mention which is designated at 16. The valve body is further provided with an inlet in the form of a radial projecting portion 17 with a bore 18 extending therethrough into communication with the bore 13 on the opposite side of constriction 14 from valve seat 16. The flow passage through the valve hence extends through the bore 18, into bore 13, through a central aperture 19 defined by constriction 14, and into a terminal portion 21 of bore 13 at the end of the body which is adjacent the flange 12.

The stem of the valve is designated at 22 and will be seen to be of elongated cylindrical configuration coaxially extending through the bore 13 of body 11. The stem is provided with an enlarged head 23 which is preferably bevelled, as shown at 24, in the transition region between the head and the remainder of the stem so as to be snugly engageable with the seat 16. In addition, the head is preferably provided with a plurality of circumferentially spaced longitudinally extending flutes 26 for gas passage and having lands which are in engagement with the bore portion 21. Mounting of the stem 22 is facilitated as by means of a flexible diaphragm 27 concentrically secured about the stem and marginally secured to the wall of the bore 13 at a position coaxially spaced from constriction 14 on the opposite side thereof from the seat 16. In this regard, the bore 13 is preferably outwardly stepped to provide a shoulder 28 to which the marginal portions of the diaphragm are readily secured. Aside from facilitating longitudinally movable mounting of the stem 22, the diaphragm 27 transversely seals the bore 13 in a region adjacent the constriction 14 on the opposite side thereof from seat 16. More particularly, the diaphragm defines with constriction 14, the portion of the bore wall therebetween, and the seated head of the stem, a sealed chamber 29 in communication with the bore 18 of radial projection 17. Gas may be admitted through bore 18 to chamber 29 whereupon the gas flows, or is prevented from flowing into bore portion 21 depending upon whether the head 23 is disengaged from or engaged with the seat 16, respectively. Thus, the bore 18 functions as an inlet port, whereas the bore portion 21 functions as an outlet port of the valve. In this regard, the outer end of radial projection 17 is preferably flanged as indicated at 31, while the end of the body adjacent the outer end of bore portion 21 is preferably flanged at 32 to facilitate ready installation of the valve in a fluid flow system which is to be controlled.

In order to insure a gas-tight seal at the metal-to-metal seat between the bevelled portion 24 of head 23 and the seat 16, the stem 22 is spring loaded to urge the stem inwardly of the valve body in a direction to engage the head with the seat with a substantial positive closing pressure. In the present embodiment, this is advantageously accomplished by means of a header 33 which is coaxially loosely disposed on the stem at the opposite end thereof from the head 23. The header is arranged to abut stop means carried on the opposite end of the stem from head 23. Although the stop means may be variously provided, same advantageously comprises a pair of nuts 34 and 36 threadably engaged on this end of the stem and abutted by the header 33. The bore 13 is preferably outwardly stepped to provide a bearing shoulder 37 at a position longitudinally spaced from diaphragm 27 in a direction away from constriction 14. A compression spring 38 concentrically disposed about the stem 22 and acting between bearing shoulder 37 and header 33 then urges the stem in a direction to engage the head 23 with the seat 16 with substantial positive closing pressure. The magnitude of this closing pressure exerted by the loading spring may be adjusted as desired upon rotation of the nuts 34 and 36 in their threaded engagement with the end of the stem. More particularly, nut 34 may be rotated in a direction to displace same to the left, as viewed in FIGURE 1, to in turn advance the header 33 in a direction to increase the compression of the spring 38 and thereby increase the closing pressure exerted between the head and the valve seat. When the desired closing pressure is attained, the nut 36 is advanced into engagement with the nut 34 to thus lock same in position. Advancement of the nuts in the opposite direction (to the right, as viewed in FIGURE 1) reduces the compression of the spring, and therefore the closing pressure between the head and seat.

Considering now the thermally expansive means for actuating the valve from closed to open condition, in the present instance such means includes the valve stem 22 which functions as a thermally expansive member. More particularly, a heating coil 39 is concentrically disposed about the stem in the region thereof between the header 33 and diaphragm 27. A cylindrical radiation heat shield 41 is in turn concentrically disposed about the heating coil 39 to thermally isolate same from the surrounding portions of the body 11 and other internal parts of the valve. Upon energization of the heating coil 39 with electric current, same heats the stem 22 to an elevated temperature with respect to the other parts of the valve to effect relative thermal expansion thereof. Such expansion is aided by the force exerted by spring 38 and accordingly, as viewed in FIGURE 1, proceeds to the right. Upon a predetermined initial extension of the stem, the opposite end of the stem from the head 23 engages limit means which herein comprise a set screw 43 extending coaxially through and threadably engaging an end cap 44 secured to the opposite end of the body 11 from flange 12 in closing relation to the bore 13. The set screw 43 may be advanced or retracted with respect to the cap 44 to provide substantially any desired initial clearance in a gap 46 existing between the set screw and the end of the stem when the latter is in a contracted condition prior to heating thereof. The set screw 43 may be locked in any of these adjustable positions as by means of a lock nut 47 threadably engaging the set screw and tightened into abutment with the outer end of cap 44. When the stem 22 expands initially through a sufficient distance to traverse the gap 46, the end of the stem engages the set screw 43 to thus prevent further expansion of the stem in this direction. When the stem is so engaged with the set screw, the latter is operable to absorb the substantial force exerted by the compression spring 38 upon the stem through the header 33 and stop nuts 34 and 36. With such spring pressure thus absorbed, further expansion of the stem 22 effects extendible movement thereof in a direction away from the set screw 43, as viewed in FIGURE 1 towards the left. Movement of the stem in this direction effects disengagement of the head 23 from seat 16 to thus open the valve and establish flow between bore 18 and bore portion 21. Upon deenergization of the heating coil 39 the stem 22 cools and hence contracts to ultimately disengage the end of the stem from the set screw 43 whereupon the spring 38 again exerts pressure on the stem in a direction to urge the head 23 into engagement with the seat 16 and thus close the valve to interrupt flow between the bore 18 and bore portion 21.

Although the flow of most materials will proceed through the valve under normal ambient temperature conditions (e.g., temperatures of the order of 70° F.), with certain other materials the flow will only proceed where the flow passage is maintained at a relatively high temperature. For example, in the case of cesium vapor, an ambient temperature approaching 800° F. is preferably maintained in the flow passage, as well as adjacent the internal parts of the valve other than the thermally expansive stem 22, in order to maintain the vapor flow. To this end, heating coils 48 are preferably concentrically disposed about the body 11 in the region thereof adjacent chamber 29 and constriction 14, as well as about radial projection 17. Such coils may be energized to establish the desired ambient temperature conditions within the valve conducive to the ready flow of material therethrough. In order to conserve the heat generated by coils 48 such that the ambient temperature in the valve may be efficiently maintained, a heat barrier is preferably provided about the major portions of the valve body 11. In this regard, the present embodiment of the valve is designed for operation in a vacuum and the vacuum environment serves as an insulation to heat transfer exteriorly of the body by conduction and convection. Therefore, it is only necessary to consider heat transfer by radiation in the provision of the heat barrier. Preferably the barrier comprises a plurality of elongated cylindrical radiation shield cans 49 formed with semi-spherical closures at one end and open at the other. The cans are disposed in nested concentric relation about the valve body, the open ends of the cans being respectively engaged in a plurality of spaced concentric grooves 51 provided in flange 12. The cans are provided with enlarged aligned apertures 52 in the portions thereof engaging the grooves, and threaded fasteners 53 extend radially through the flange and traverse the apertures to secure the cans in place. By virtue of the clearance between the fasteners 53 and the enlarged apertures 52, the cans are free to expand and contract within the slots 51 with changes in the ambient temperature within the valve. Similarly, the radial projection 17 of the body traverses aligned enlarged apertures 54 provided in the shield cans 49 to permit freedom of relative movement between the cans and body. By virtue of the cans, and the vacuum environment within which the valve is disposed in operation, heat loss from the valve body is substantially minimized. Loss of heat from the valve is further minimized by the provision of a slot 55 which extends radially into the periphery of the flange 12 adjacent the ends of the cans engaging the grooves 51. This slot 55 functions as a radiation barrier to heat transfer through the flange 12. In further regard to heat transfer within the valve, it is to be noted that heat transfer between the valve stem 22 and the valve body 11 subsequent to opening of the valve, in the region of the chamber 29, occurs only through the diaphragm 27 and the flutes 26 of the head. Inasmuch as the flutes and diaphragm constitute relatively small heat transfer areas, the temperature gradient between the valve body and stem is readily maintained. Of course, for valve operation in other than vacuum, conventional insulation means may be employed to minimize heat transfer by conduction and convection.

Considering now a modified form of the valve and referring to FIGURES 5 and 6, the instant valve embodiment will be seen to include a body 56 of cylindrical configuration including an outwardly flared annular flange 57 at one end. A valve inlet is formed by a radial projection 58 engaging the body and having a passage 59 coaxially of the projection intersecting an enlarged portion 61 of a bore 62 coaxially of the body. The bore 62 is bevelled between the enlarged portion 61 and a reduced portion 63 thereof to define a valve seat 64 facing the enlarged portion of the bore. The valve additionally includes a stem 66 disposed in coaxial relation to the bore 62 of the body and including a head 67 at one end which is provided with a bevelled portion for engagement with the seat 64, and flutes to provide a gas passage at its other end.

The stem 66 is spring loaded in a direction to normally engage the head 67 with the seat 64 with a substantial closing pressure. To this end, a compression spring 68 is provided which acts between the stem and a header 69 coaxially disposed about the stem at the opposite end thereof from the head and supported in such position by a plurality of circumferentially spaced thermally expansive members 71 secured between the header and the body flange 57 in parallel relation to the stem. More particularly, the stem is provided with an outwardly flared bearing surface, preferably comprised by a pair of nuts 72 and 73 threadably engaging a central portion of the stem in spaced relation to the header. The spring 68 is then concentrically disposed about the stem with opposite ends respectively bearing against the header 69 and nut 72. In this regard, a washer 74 is advantageously interposed between the nuts and end of the spring to prevent the spring from cutting into the nut and to eliminate any tendency for the spring to rotate or wind up. The amount of closing pressure exerted by the spring between the head and seat is readily adjustable by rotation of the nuts 72 and 73 to vary the amount of spring compression.

The spring loading means associated with the stem may additionally advantageously include a second spring 76 which biases the stem in a direction to disengage the head from the seat, but which is substantially weaker than the spring 68. Thus, the force exerted by spring 68 normally substantially more than offsets the opposing force of the spring 76 and substantial closing pressure is accordingly exerted between the head and the seat. Spring 76 is concentrically disposed about the stem and bears at one end against the base of the enlarged bore portion 61 of the body 56 and bears at the other end against a collar 77 provided on the stem at a position intermediate the head and nuts 72 and 73. A bellows 78 is additionally provided concentrically disposed about the spring in spaced relation thereto and is secured at its opposite ends to the valve body and the collar 77 of the stem. The bellows thus defines, with the body and collar, a sealed chamber 79 which includes the enlarged bore portion 61 and hence communicates with the bore 59 of the body projection 58. The bellows also permits movement of the valve stem coaxially of the seat. The chamber 79 is comparable to the chamber 29 of the valve embodiment of FIGURES 1–4 hereinbefore described, in the present instance gas flowing into the chamber 79 through bore 59, and gas flow from the chamber to the reduced portion 63 of the bore 62, being in turn controlled by the opening and closing actions of the head relative to the seat.

To facilitate opening of the valve in response to thermal expansion of the expansive members 71, means are provided to absorb the force exerted by spring 68 on the stem in such a manner that further expansion effects movement of the stem under the influence of spring 76 in a direction to disengage the head from the seat. In the present embodiment, such means are provided as a stop, preferably in the form of a pair of nuts 81 and 82 in threadable engagement with the stem at a position in close coaxial spaced relation to the header 69 when the expansion rods 71 are in contracted condition. Upon expansion of the rods, the header engages the nut 81 such that the entire force of the spring 68 is absorbed between nuts 81 and 81 and nuts 72 and 73. Thereafter, with the header bearing against the nut 81, further expansion of the rods 71 effects movement of the stem with the assistance of spring 76 in a direction to disengage the head from the seat (to the right as viewed in FIGURE 5). The spacing between the nuts 81 and 82 and the header 69 may, of course, be varied as desired by rotating the nuts. In this manner, various desired thermal clearances may be established such that differences in ambient temperature may occur in the valve without the inducement of valve action. Premature opening of the valve is hence prevented, valve opening being only effected in response to the establishment of a substantial intended temperature differential between the expansion rods 71 and the other parts of the valve, particularly the stem 66.

To obtain controlled expansion of the rods 71, a heating coil 83 is preferably concentrically disposed about each one thereof. A tubular heat shield 84 is disposed in concentric encompassing relation about each heating coil 83 and its associated expansion rods 71. The heat shield greatly minimizes the transfer of heat generated by the coils 83 to parts of the valve other than the expansion rods 71 in order to facilitate the establishment of the desired substantial temperature differential therebetween, which effects valve opening. Upon energization of the coils 83 with electrical current, the expansion rods 71 are heated to a temperature substantially greater than the ambient temperature of the other parts of the valve. The rods accordingly expand with respect to the other valve parts to in turn urge the header 69 against the nut 81 whereupon the force of spring 68 is absorbed and further expansion of the rods moves the stem to disengage the head from the seat.

As in the case of the embodiment of FIGURES 1-4, previously described, the present embodiment is arranged to maintain a relatively high ambient temperature within the valve, particularly in regions including and adjacent to the flow path through the valve body 56, which high temperature is conducive to the flow of the cesium vapor or equivalent material to be controlled by the valve. To this end, a plurality of heating coils 86 are provided adjacent the bellows 78 and proximal end of the body 56 as well as about the radial projection 58. The heat generated by these coils upon energization with electrical current maintains the desired ambient temperature in the flow path through the valve. In order to conserve the heat generated by the coils 86 a heat barrier is provided about the valve assembly. The heat barrier preferably comprises a plurality of spaced concentric cylindrical radiation shields 87 having one end freely engaging a plurality of spaced-apart concentric grooves 88 provided in the body flange 57. A plurality of substantially dome-shaped end caps 89 are coaxially disposed on the end of the stem 66 adjacent the nuts 81 and 82 and are spaced apart by spacers 90 coaxially interposed therebetween. The radiation shielding end caps 89 are respectively provided with depending cylindrical marginal flanges 91 which are concentrally interposed between adjacent ones of the cylindrical shields 87 at their free ends. The entire heat barrier assembly may then be readily secured together as by means of a nut 92 in threaded engagement with the free end of the stem 66 and bearing against the end face of the outermost ones of the end caps 89. The cylindrical shields 87 are thus free to move within the slots 88 and between the respective end caps 89 during expansions and contractions of the shield with variations in ambient temperature. Similarly, the end caps 89 are free to move relative to the shields 87 during movements of the stem 66. A slot 93 extending radially into the periphery of flange 57 is additionally preferably provided to define a radiation barrier to heat transfer through the flange. By virtue of the cylindrical shields 87, the end cap shields 89, and the slot 93, heat transfer by radiation from the ambient temperature environment about the internal parts of the valve as established by heating coils 86 is materially minimized. It should be noted that the valve is intended for operation in a vacuum, and the vacuum serves as an insulation to heat transfer from the body by conduction and convection. Here again, conventional insulation means may be employed to supplement the radiation shielding for valve operation in other than a vacuum environment.

With regard to the energization of the thermally expansive member heating coils, and the ambient temperature establishing heating coils of either of the valve embodiments of FIGURES 1-4, or FIGURES 5 and 6, it will be appreciated that means may be advantageously provided to supply a substantially greater energization current to the expansive member heating coils than is supplied to the ambient temperature establishing coils. To this end, the valve embodiment of FIGURES 5 and 6 may have its heating coils 83 and 86 connected to a heater control means 94, as depicted in FIGURE 7. The heating coils 39 and 48 of the embodiment of FIGURES 1-4 may as well be connected to the heater control means 94 in a similar manner. The heater control means 94 is arranged to maintain a predetermined constant current flow through the ambient temperature establishing coils, for example coils 86, which is conducive to the establishment of a predetermined ambient temperature. In addition, the control means 94 is capable of selectively establishing a substantially greater current flow through the expansive member heating coils, for example coils 83, which is conducive to the establishment of a temperature substantially greater than ambient. In one specific example of the valves described hereinbefore, the control means 94 is arranged to energize the coils 86 to establish an ambient temperature of the order of 800° F. The control means is additionally arranged to selectively energize the coils 83 commensurate with the establishment of a temperature of the order of 200° F. greater than the ambient temperature, in other words, a temperature of the order of 1000° F. The temperature differential is sufficient to effect expansion of the expansive members to the extent necessary to incapacitate the closing pressure of the loading spring and move the stem to a position wherein the head is entirely disengaged from the seat.

Although the present invention has been described hereinbefore with respect to several preferred embodiments thereof, it will be appreciated that various modifications and changes may be made therein without departing from the true spirit and scope of the invention, and thus it is not intended to limit the invention except by the terms of the following claims.

What is claimed is:

1. A thermally operated valve comprising a body having a flow passage including a valve seat therein, said body including a hollow extension coaxially disposed with respect to said seat on the opposite side of the body therefrom, a stem disposed coaxially within said extension and including a valve head engageable with said seat, a header coaxially loosely disposed on said stem, stop means on said stem engaging said header, a compression spring disposed within said extension and acting between said extension and said header to urge said stem in a direction outwardly from said extension and engage said head with said seat, limit means secured to the outer end of said extension in coaxial spaced relation to said stem for engaging same in response to expansion thereof, heating coil means disposed about said stem for selectively thermally expanding same, and heat shield means disposed about said coil means to thermally isolate same from said extension.

2. A thermally operated valve according to claim 1, further defined by second heating coil means disposed adjacent said body to establish a predetermined ambient temperature in said flow passage, and heat shield means enclosing said body extension.

3. A thermally operated valve comprising a generally cylindrical elongated hollow body with a constriction therein adjacent a first end thereof, said constriction having a valve seat on the side thereof adjacent said first end of the body, said body including a flow passage communicating with the body interior adjacent said constriction on the opposite side thereof from said seat, a stem disposed coaxially within said body including a head at one end engageable with said seat, a diaphragm secured in sealed relation between said stem and body at a position adjacent said flow passage to define a sealed chamber communicating said flow passage and constriction, a header coaxially loosely disposed on said stem, stop means on said stem adjacent the opposite end thereof from said head and engaging said header, a compression spring within said body acting between the body and said header to urge said stem in the direction of the second end of said body and thereby engage said head with said seat, limit means secured to said second end of said body in coaxial spaced relation to said stem for engaging same in response to expansion thereof, heating coil means disposed about said stem between said diaphragm and said header for selectively heating said stem to thermally expand the same, and heat shield means disposed about said coil means to thermally isolate same from said body.

4. A valve according to claim 3, further defined by said stop means comprising a pair of abutting nuts threadably engaging said stem and abutting said header, said nuts upon rotation being thereby variable in their position coaxially of said stem to in turn vary the compressive force of said spring, and said limit means being adjustable in its positions coaxially of said body.

5. A valve according to claim 3, further defined by second heating coil means disposed adjacent said body to maintain an ambient temperature in said sealed chamber and said flow passage, and by heat shield means disposed in enclosing relation to said body.

6. A valve according to claim 5, further defined by said body having an outwardly flared annular flange, and by said heat shield means comprising a plurality of nested spaced-apart cylindrical cup-shaped heat shields having their open ends engaging a plurality of spaced concentric annular grooves in said flange, said flange having an annular slot extending radially into its periphery to define a radiation barrier adjacent said grooves engaged by the open ends of said heat shields.

References Cited by the Examiner
UNITED STATES PATENTS

| | | | |
|---|---|---|---|
| 1,231,044 | 6/17 | Mayer | 236—102 X |
| 2,373,324 | 4/45 | Martin | 251—11 X |

M. CARY NELSON, *Primary Examiner.*